US012504140B2

(12) United States Patent
Kato et al.

(10) Patent No.: US 12,504,140 B2
(45) Date of Patent: Dec. 23, 2025

(54) VEHICLE LAMP

(71) Applicant: NICHIA CORPORATION, Anan (JP)

(72) Inventors: Masaru Kato, Sagamihara (JP); Hiroshi Miyairi, Yokohama (JP); Masayoshi Katsuno, Yokohama (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/976,175

(22) Filed: Dec. 10, 2024

(65) Prior Publication Data

US 2025/0198585 A1 Jun. 19, 2025

(30) Foreign Application Priority Data

Dec. 14, 2023 (JP) ................................ 2023-211535

(51) Int. Cl.

| | |
|---|---|
| ***F21S 41/365*** | (2018.01) |
| ***F21S 41/25*** | (2018.01) |
| ***F21S 41/33*** | (2018.01) |
| ***F21S 41/40*** | (2018.01) |
| ***F21S 41/663*** | (2018.01) |
| ***F21Y 115/10*** | (2016.01) |

(52) U.S. Cl.

CPC ............ *F21S 41/365* (2018.01); *F21S 41/25* (2018.01); *F21S 41/333* (2018.01); *F21S 41/40* (2018.01); *F21S 41/663* (2018.01); *F21Y 2115/10* (2016.08)

(58) Field of Classification Search

CPC .............................. F21S 41/365; F21S 41/147

See application file for complete search history.

(56) References Cited

U.S. PATENT DOCUMENTS

| | | | | |
|---|---|---|---|---|
| 7,708,439 B2 * | 5/2010 | Naganawa | F21S 41/25 | 362/322 |
| 2005/0219856 A1 * | 10/2005 | Tatsukawa | F21S 41/26 | 362/538 |
| 2006/0285341 A1 * | 12/2006 | Yatsuda | F21S 41/125 | 257/E33.072 |
| 2007/0019431 A1 * | 1/2007 | Kinoshita | F21S 41/689 | 362/539 |

(Continued)

FOREIGN PATENT DOCUMENTS

| | | |
|---|---|---|
| JP | 2008-117561 | 5/2008 |
| JP | 2009-245620 | 10/2009 |

(Continued)

*Primary Examiner* — Eric T Eide

(74) *Attorney, Agent, or Firm* — MORI & WARD, LLP

(57) ABSTRACT

A vehicle lamp includes a first light source configured to emit light in a direction along a vertical direction; a first reflector having a first reflective surface that allows a portion of the light emitted from the first light source to be reflected forward; a second reflector having a pair of second reflective surfaces that allow light traveling without being reflected by the first reflective surface to be reflected leftward and rightward; a third reflector having a pair of third reflective surfaces that allow light reflected by the second reflective surfaces to be reflected forward; and a first lens that allows light reflected by the first reflective surface and light reflected by the pair of third reflective surfaces to exit forward through an exit surface. A maximum length of the first lens in the vertical direction is smaller than a maximum length of the first lens in a left-right direction.

11 Claims, 15 Drawing Sheets

(56) References Cited

U.S. PATENT DOCUMENTS

| | | | | |
|---|---|---|---|---|
| 2007/0115679 | A1* | 5/2007 | Alcelik | F21S 41/60 362/512 |
| 2009/0067186 | A1* | 3/2009 | Futami | F21S 41/26 362/509 |
| 2010/0067249 | A1* | 3/2010 | Suzuki | F21S 41/148 362/539 |
| 2011/0249461 | A1 | 10/2011 | Sugie et al. | |
| 2013/0021817 | A1* | 1/2013 | Ishida | F21S 41/43 362/517 |

FOREIGN PATENT DOCUMENTS

| | | |
|---|---|---|
| JP | 2011-222366 | 11/2011 |
| JP | 2012-134174 | 7/2012 |
| JP | 2013-143361 | 7/2013 |

* cited by examiner

100

VEHICLE LAMP

CROSS-REFERENCE TO RELATED APPLICATIONS

This application is based on and claims priority to Japanese Patent Application No. 2023-211535, filed on Dec. 14, 2023, the entire contents of which are incorporated herein by reference.

BACKGROUND

1. Technical Field

The present disclosure relates to a vehicle lamp.

2. Description of Related Art

Vehicle lamps including light-emitting elements such as light-emitting diodes (LEDs) are known. For example, Japanese Patent Publication No. 2012-134174 describes a vehicle lamp including a semiconductor light source, a first reflector having a reflective surface that reflects light emitted from the semiconductor light source, a second reflector having reflective surfaces located on both sides of the semiconductor light source, and a first projection lens that projects the light from the first reflector forward.

In a vehicle lamp, in order to improve the design of a vehicle when the vehicle lamp is disposed in the vehicle, it may be necessary to reduce the maximum length of the exit surface of the vehicle lamp in the vertical direction in some cases. However, in the vehicle lamp described in Japanese Patent Publication No. 2012-134174, if the maximum length of the exit surface of the vehicle lamp in the vertical direction is reduced, the amount of light exiting from the first projection lens is reduced, thereby potentially leading to lower light extraction efficiency of the vehicle lamp.

SUMMARY

It is an object of one embodiment of the present disclosure to provide a vehicle lamp having high light extraction efficiency while reducing the maximum length of an exit surface in the vertical direction.

According to one embodiment of the present disclosure, a vehicle lamp for emitting light through an exit surface forward in a front-rear direction intersecting a vertical direction is provided. The vehicle lamp includes: a first light source configured to directly or indirectly emit light in a direction along the vertical direction; a first reflector having a first reflective surface that allows a portion of the light emitted from the first light source to be reflected forward; a second reflector having a pair of second reflective surfaces, the pair of second reflective surfaces being located above the first reflective surface in the vertical direction, and allowing light, of the light emitted from the first light source, traveling without being reflected by the first reflective surface to be reflected leftward and rightward in a left-right direction intersecting each of the front-rear direction and the vertical direction; a third reflector having a pair of third reflective surfaces, the pair of third reflective surfaces being located at a left side and a right side of the first reflective surface in the left-right direction so as to correspond to the pair of second reflective surfaces, and allowing light reflected by the pair of second reflective surfaces to be reflected forward; and a first lens having the exit surface, and configured to receive light reflected by the first reflective surface and light reflected by the pair of third reflective surfaces and allow the light reflected by the first reflective surface and the light reflected by the pair of third reflective surfaces to exit forward through the exit surface. A maximum length of the first lens in the vertical direction is smaller than a maximum length of the first lens in the left-right direction.

DETAILED DESCRIPTION

Figure 1:
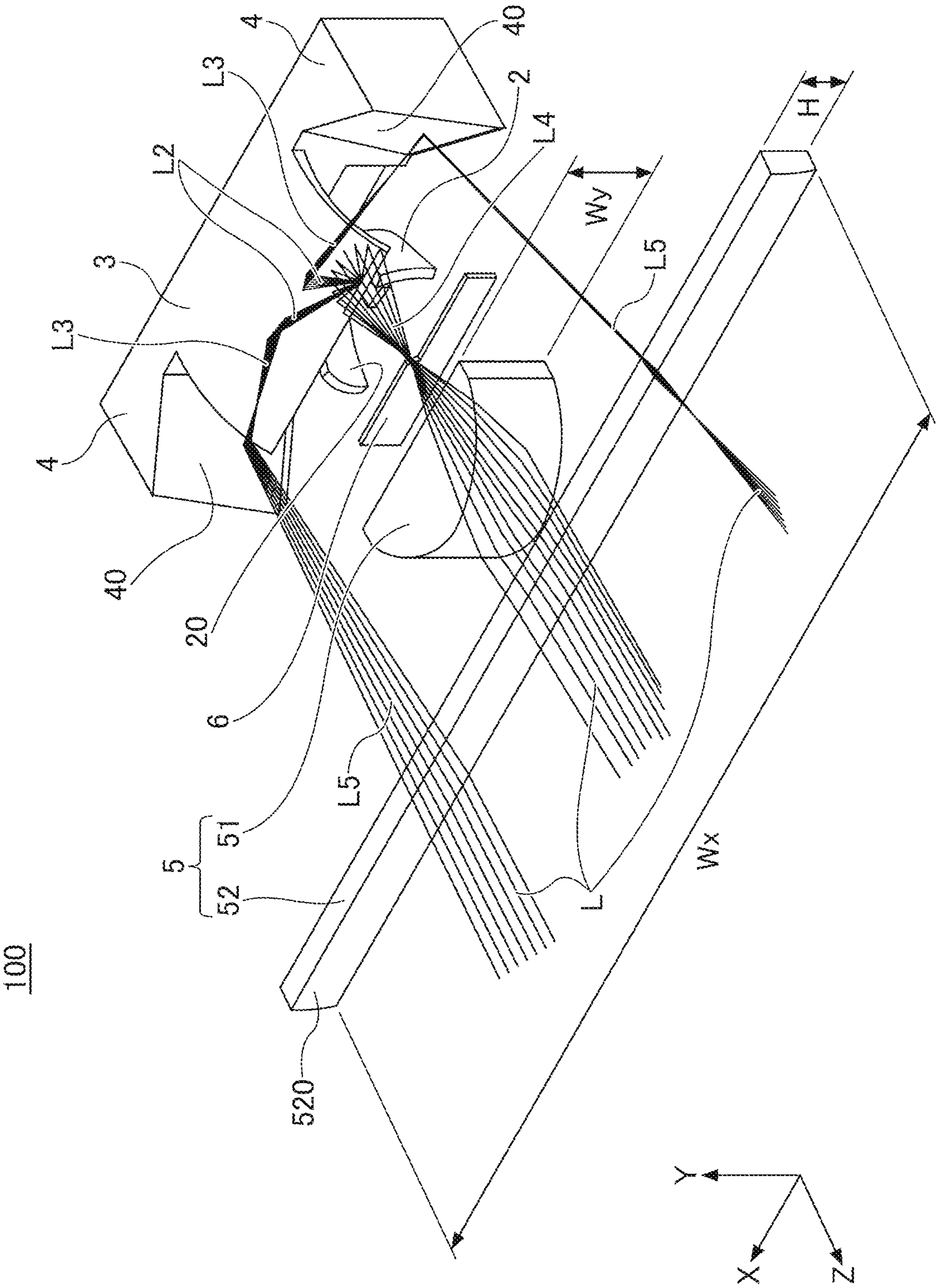
FIG. 1 is a schematic perspective view of a vehicle lamp according to a first embodiment.

Vehicle lamps according to embodiments of the present disclosure will be described with reference to the accompanying drawings. The following embodiments exemplify the vehicle lamps to give a concrete form to the technical ideas of the present disclosure, but the present disclosure is not limited to the described embodiments. In addition, unless otherwise specified, the dimensions, materials, shapes, relative arrangements, and the like of components described in the embodiments are not intended to limit the scope of the present disclosure thereto, but are described as examples. The sizes, positional relationships, and the like of members illustrated in the drawings may be exaggerated for clearer illustration. Further, in the following description, the same names and reference numerals denote the same or similar members, and a detailed description thereof will be omitted as appropriate. An end view illustrating only a cut surface may be used as a cross-sectional view.

In the drawings, in order to indicate directions, an orthogonal coordinate system having an X-axis, a Y-axis, and a Z-axis is used. The X-axis, the Y-axis, and the Z-axis are orthogonal to one another. An X direction along the X-axis indicates a left-right direction, a Y direction along the Y-axis indicates a vertical direction, and a Z direction along the Z axis indicates a front-rear direction. A direction indicated by an arrow in the X direction is referred to as a +X direction, and a direction opposite to the +X direction is referred to as a −X direction. The +X direction corresponds to a leftward direction, and the −X direction corresponds to a rightward direction. A direction indicated by an arrow in the Y direction is referred to as a +Y direction, and a direction opposite to the +Y direction is referred to as a −Y direction. The +Y direction corresponds to an upward direction, and the −Y direction corresponds to a downward direction. A direction indicated by an arrow in the Z direction is referred to as a +Z direction, and a direction opposite to the +Z direction is referred to as a −Z direction. The +Z direction corresponds to a forward direction, and the −Z direction corresponds to a rearward direction. The vertical direction, the left-right direction, and the front-rear direction need not be orthogonal to each other as long as the vertical direction, the left-right direction, and the front-rear direction intersect one another.

The term "top view" as used in the embodiments refers to a view of an object as seen from above. The term "front view" as used in the embodiments refers to a view of an object as seen from the front. The term "side view" as used in the embodiments refers to a view of an object as seen from the right. In the embodiments described below, each of the phrases "along the X-axis", "along the Y-axis", and "along the Z-axis" includes a case where an object is at an inclination within a range of ±20° with respect to the corresponding one of the axes.

Further, in the present specification and the claims, if there are multiple components and these components are to be distinguished from one another, the components may be distinguished by adding terms "first", "second", and the like before the names of the components. Further, objects to be distinguished may be different between the specification and the claims. Therefore, even if a component recited in the claims is denoted by the same reference numeral as that of a component described in the present specification, an object specified by the component recited in the claims is not necessarily identical with an object specified by the component described in the specification.

First Embodiment

<Configuration of Vehicle Lamp According to First Embodiment>

Figure 2:
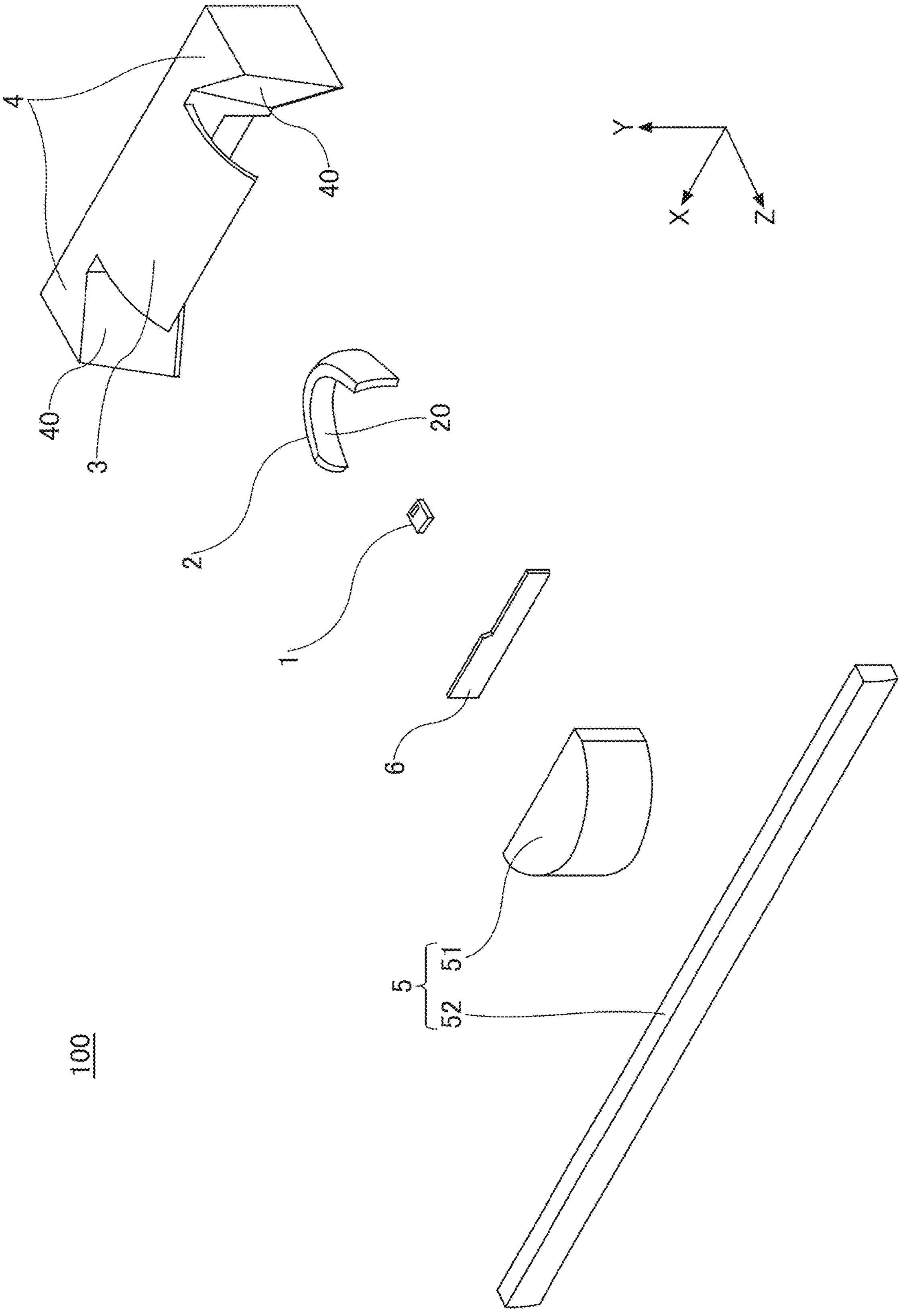
FIG. 2 is a schematic exploded perspective view of the vehicle lamp according to the first embodiment.
Figure 3:
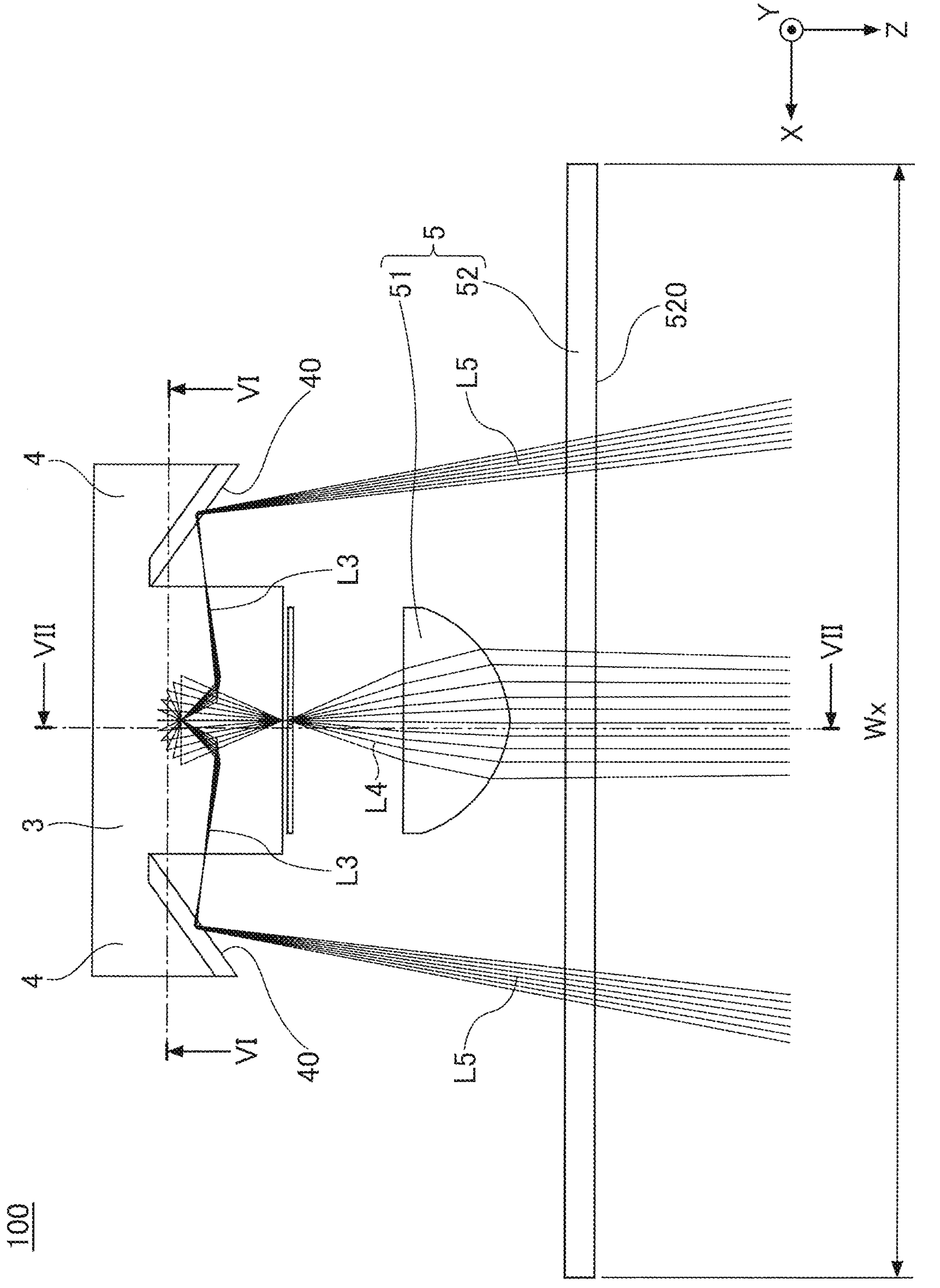
FIG. 3 is a schematic top view of the vehicle lamp according to the first embodiment.
Figure 4:
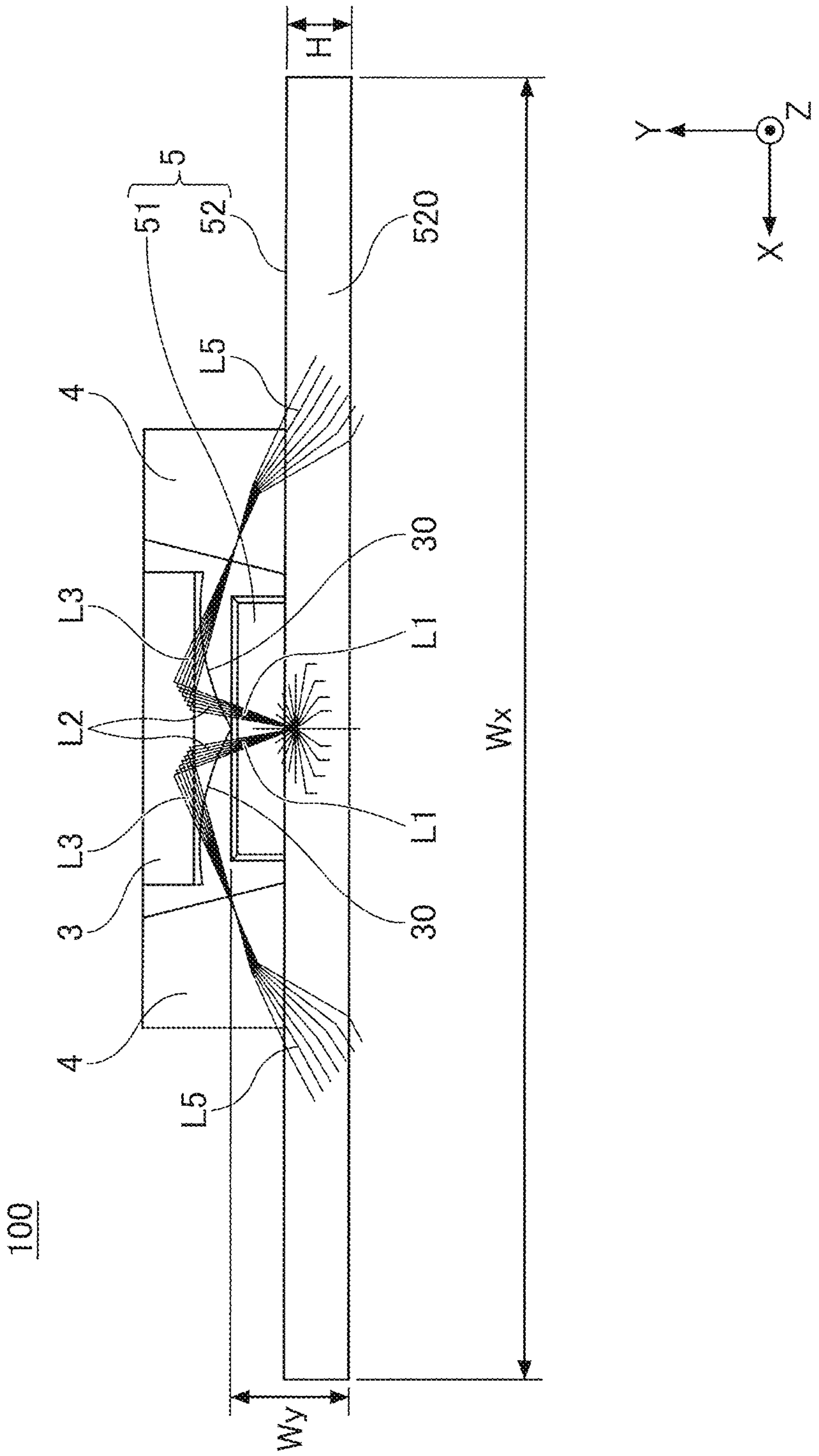
FIG. 4 is a schematic front view of the vehicle lamp according to the first embodiment.
Figure 5:
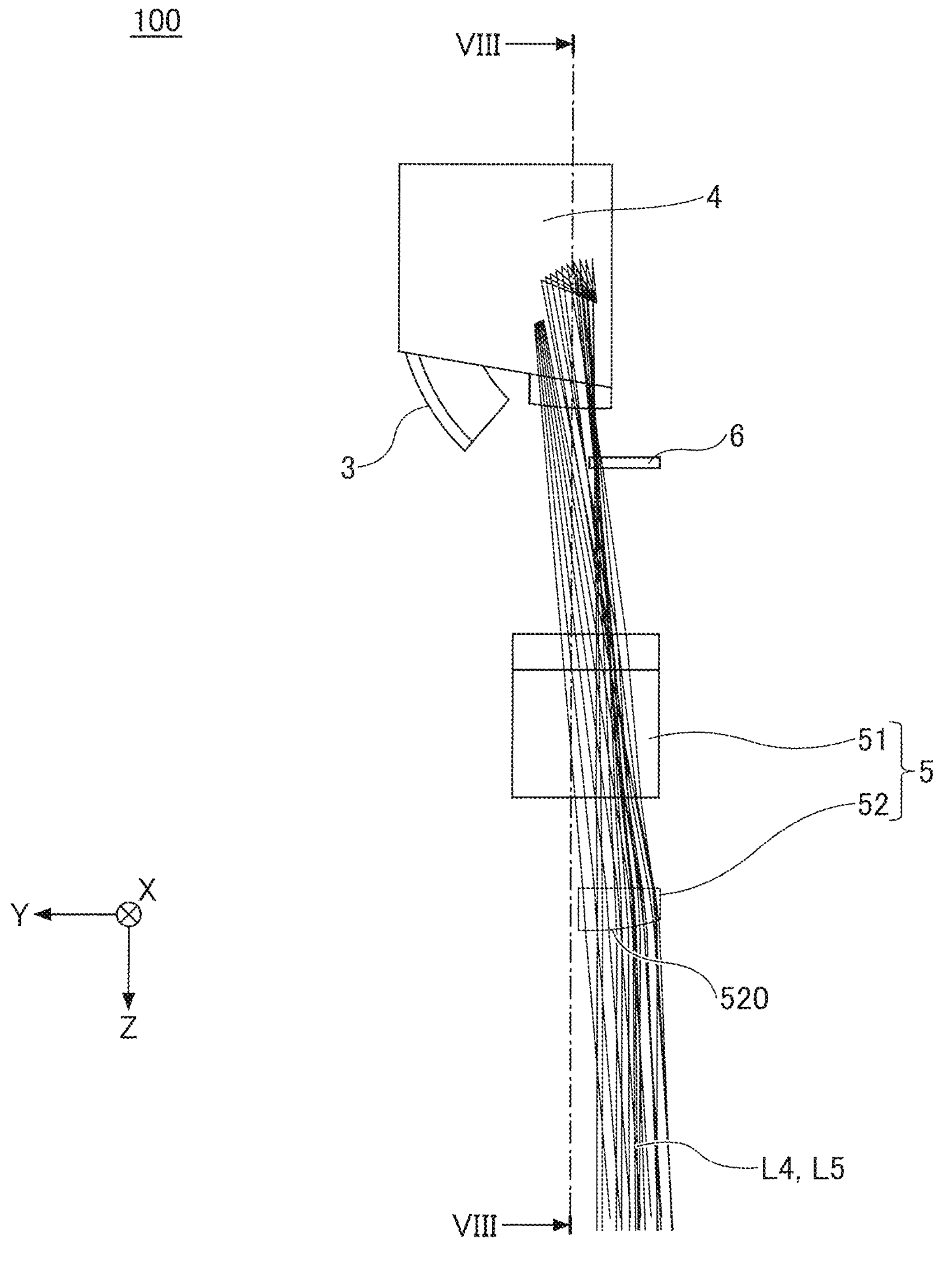
FIG. 5 is a schematic side view of the vehicle lamp according to the first embodiment.
Figure 6:
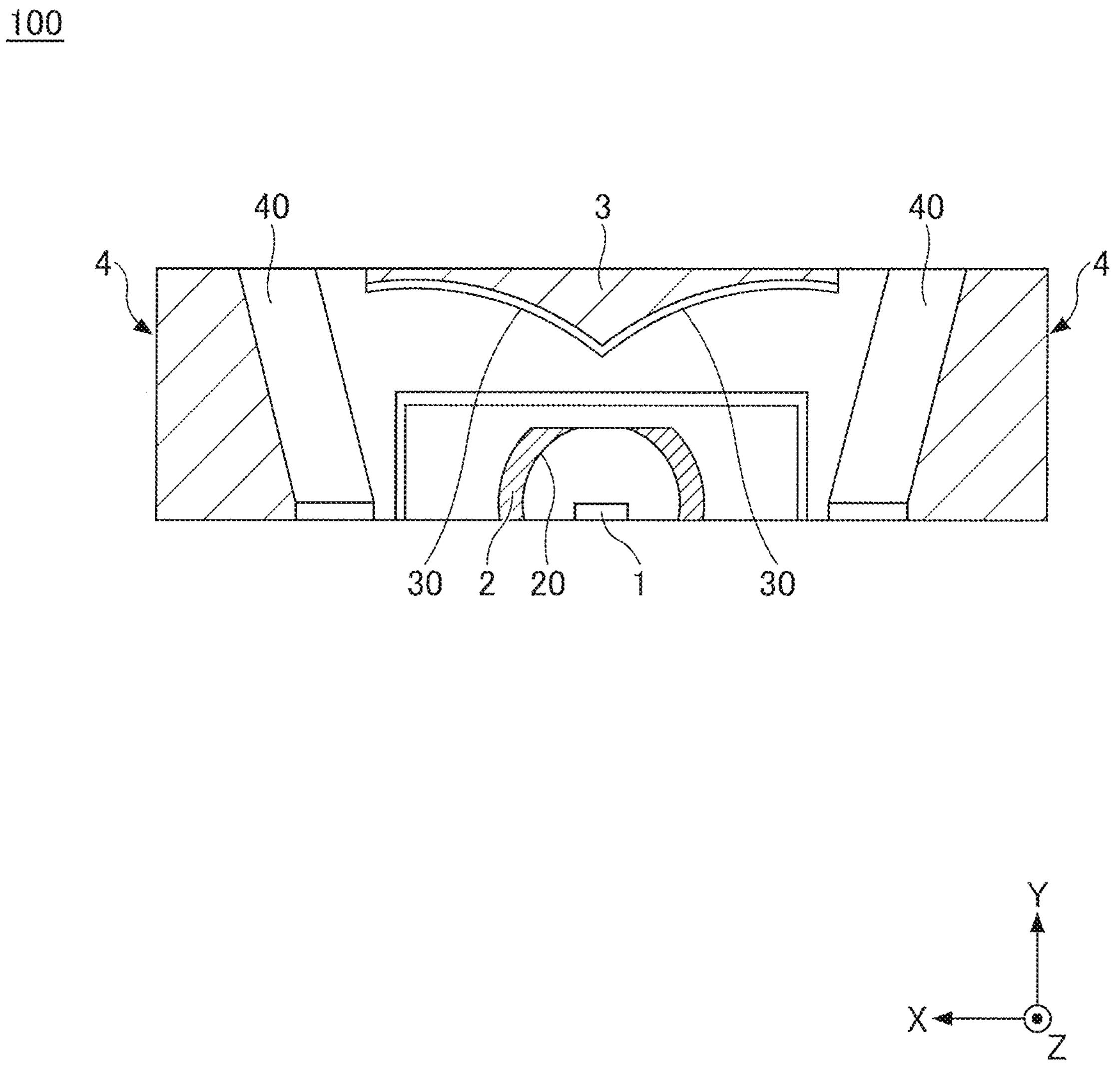
FIG. 6 is a schematic cross-sectional view taken through line VI-VI of FIG. 3.
Figure 7:
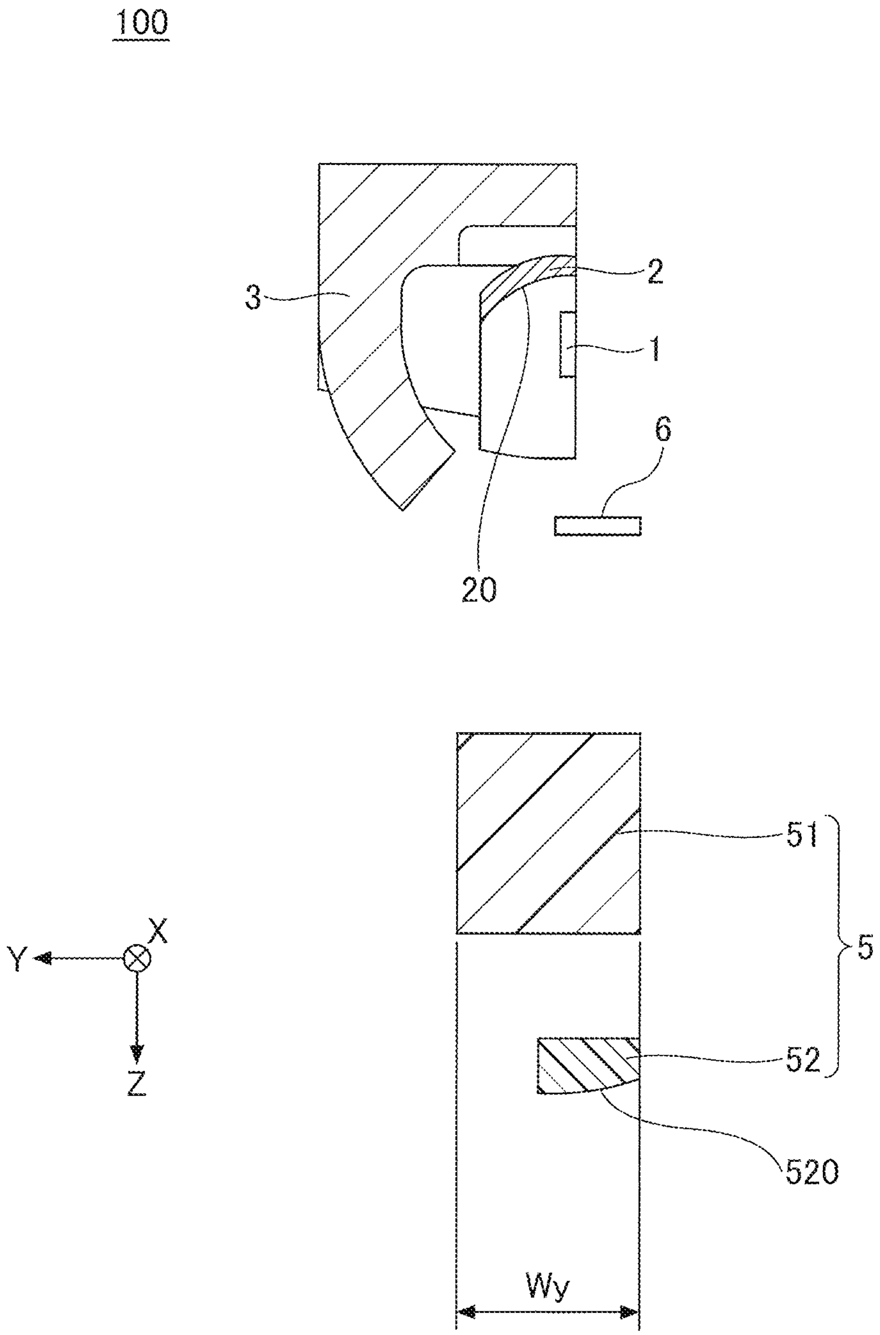
FIG. 7 is a schematic cross-sectional view taken through line VII-VII of FIG. 3.
Figure 8:
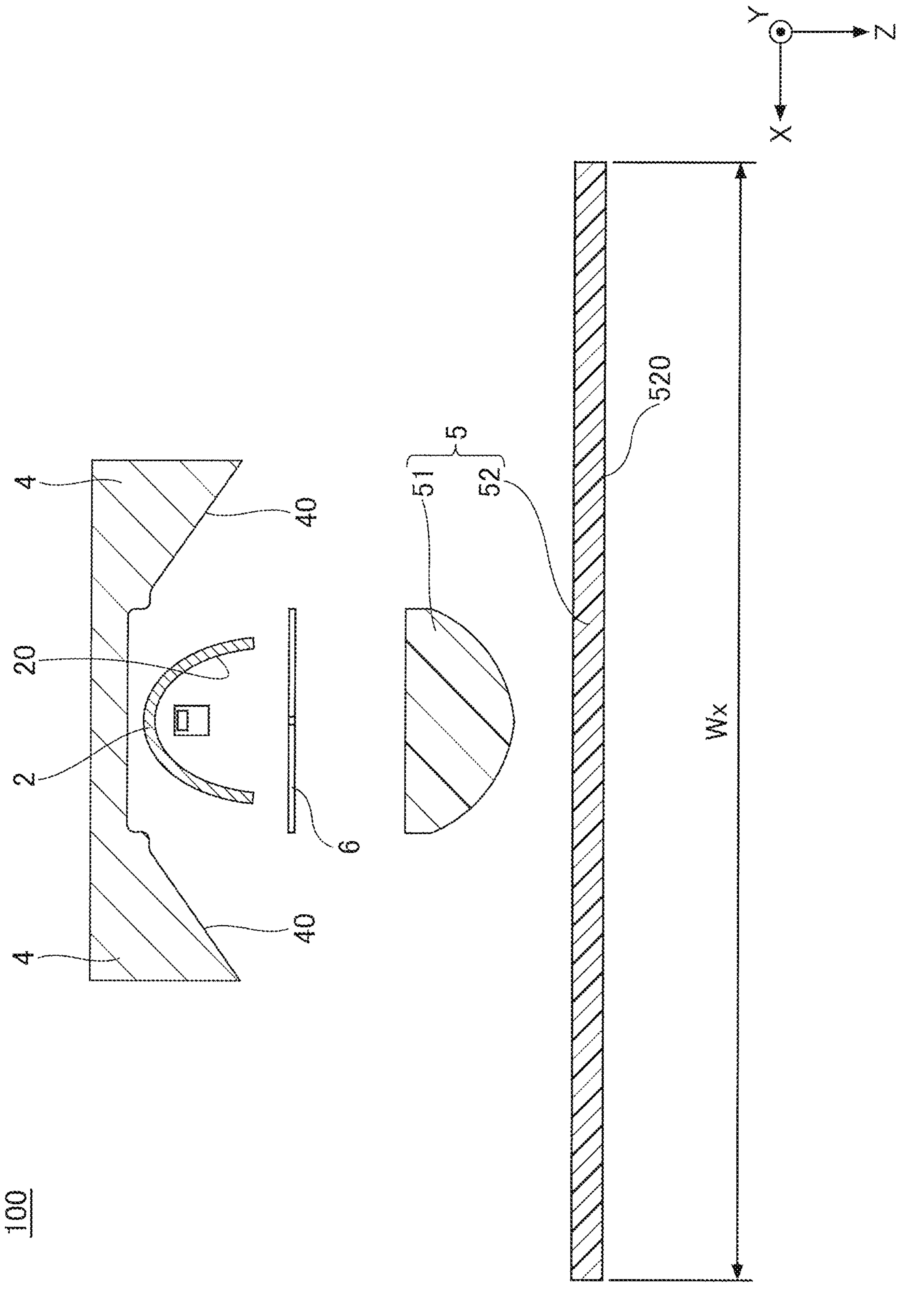
FIG. 8 is a schematic cross-sectional view taken through line VIII-VIII of FIG. 5.
Figure 9:
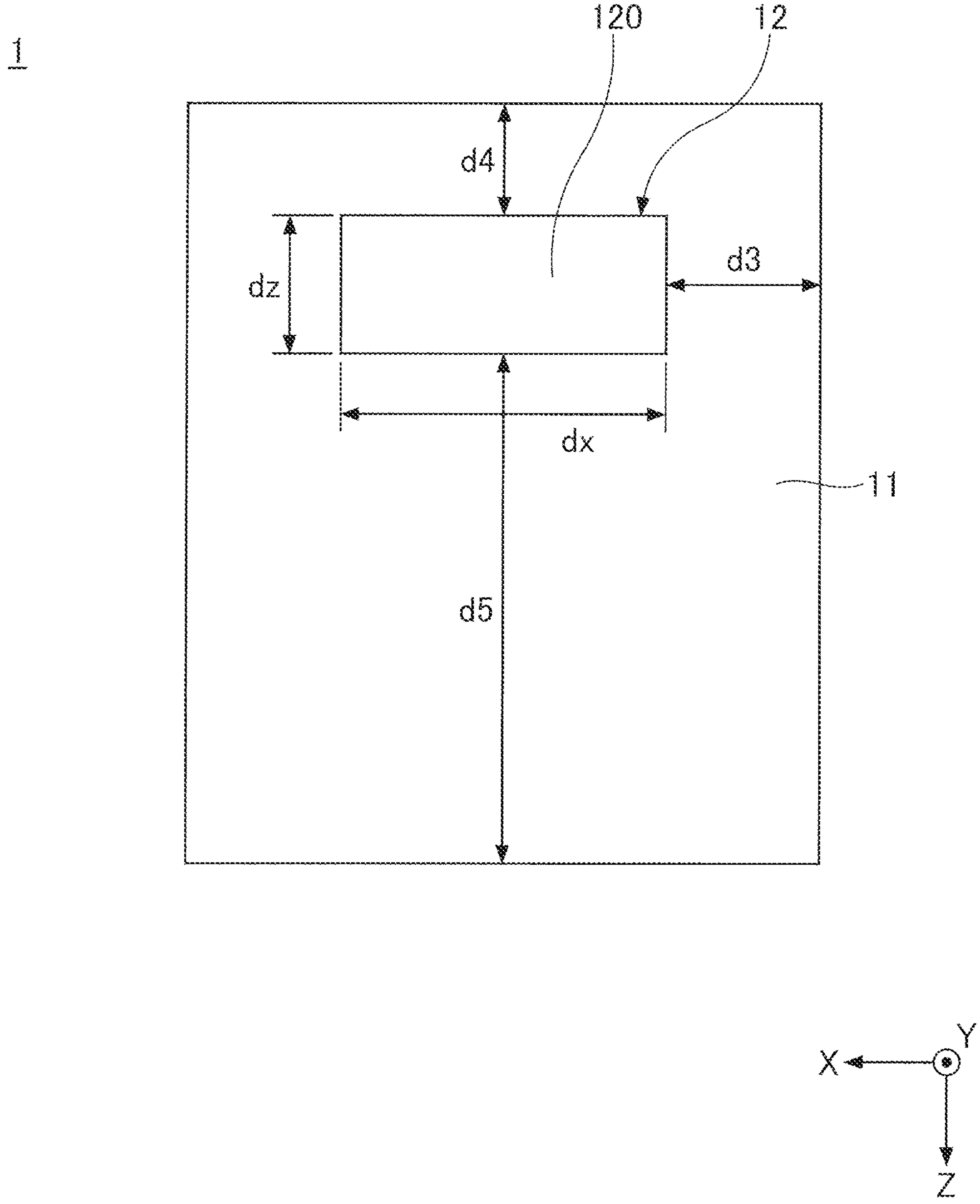
FIG. 9 is a schematic top view illustrating a first light source of the vehicle lamp according to the first embodiment.
Figure 10:
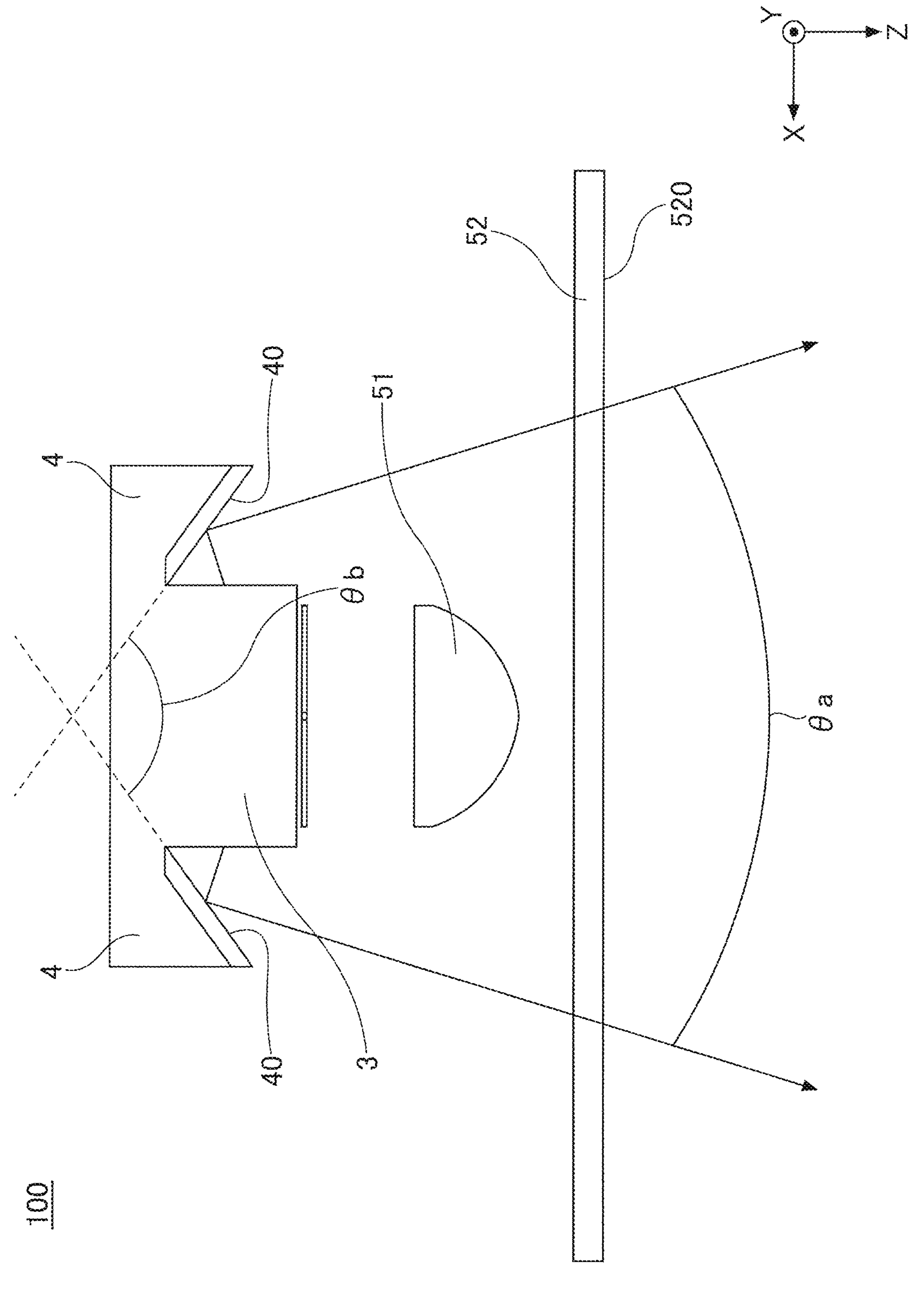
FIG. 10 is a drawing illustrating a relationship between a spread angle in the right-left direction of light emitted from the vehicle lamp according to the first embodiment and an angle formed by a pair of third reflective surfaces.

A configuration of a vehicle lamp according to a first embodiment will be described with reference to FIG. 1 to FIG. 10. FIG. 1 to FIG. 8 are drawings illustrating an example of a vehicle lamp 100 according to the first embodiment. FIG. 1 is a schematic perspective view of the vehicle lamp 100. FIG. 2 is a schematic exploded perspective view of the vehicle lamp 100. FIG. 3 is a schematic top view of the vehicle lamp 100. FIG. 4 is a schematic front view of the vehicle lamp. FIG. 5 is a schematic side view of the vehicle lamp 100. FIG. 6 is a schematic cross-sectional view taken through line VI-VI of FIG. 3. FIG. 7 is a schematic cross-sectional view taken through line VII-VII of FIG. 3. FIG. 8 is a schematic cross-sectional view taken through line VIII-VIII of FIG. 5. FIG. 9 is a schematic top view illustrating an example of a first light source 1 of the vehicle lamp 100. FIG. 10 is a drawing illustrating an example of a relationship between a spread angle in the right-left direction of light L emitted from the vehicle lamp 100 and an angle formed by a pair of third reflective surfaces 40.

In FIG. 1, FIG. 3, FIG. 4, and FIG. 5, light L1 to light L5 of light emitted from the first light source 1 of the vehicle lamp 100 and then exiting from the vehicle lamp 100 are represented by a plurality of straight lines. In addition, in order to make it easy to understand paths through which the light passes, in FIG. 1, FIG. 3, FIG. 4, and FIG. 5, a plurality of straight lines representing each of the light L1 to the light L5 are overlaid on members.

The vehicle lamp 100 is a vehicle lamp that can emit, through an exit surface 520, light L forward (toward the +Z side) in the front-rear direction (in the Z direction) intersecting the vertical direction (the Y direction). The vehicle lamp 100 is a lamp such as a headlight mounted on a vehicle such as an automobile.

The vehicle lamp 100 includes the first light source 1 configured to directly or indirectly emit light L1 in a direction along the vertical direction, and a first reflector 2 having a first reflective surface 20 that allows a portion of the light L1 emitted from the first light source 1 to be reflected forward (toward the +Z side). Further, the vehicle lamp 100 includes a second reflector 3 having a pair of second reflective surfaces 30. The pair of second reflective surfaces 30 are located above (on the +Y side of) the first reflective surface 20 in the vertical direction, and allow light L2, of the light L1 emitted from the first light source 1, traveling without being reflected by the first reflective surface 20 to be reflected leftward (toward the +X side) and rightward (toward the −X side) in the left-right direction (in the X direction) intersecting each of the front-rear direction and the vertical direction. Further, the vehicle lamp 100 includes a third reflector 4 having a pair of third reflective surfaces 40. The pair of third reflective surfaces 40 are located on the left side and the right side of the first reflective surface 20 in the left-right direction so as to correspond to the pair of second reflective surfaces 30, and allow light L3 reflected by the pair of second reflective surfaces 30 to be reflected forward. Further, the vehicle lamp 100 includes a first lens 5 having the exit surface 520, and configured to receive light L4 reflected by the first reflective surface 20 and light L5 reflected by the pair of third reflective surfaces 40 and allow the light L4 and the light L5 to exit forward through the exit surface 520. The first lens 5 may be composed of one lens or may be composed of a plurality of lenses. In the present embodiment, the first lens 5 is composed of two lenses, that is, a first cylindrical lens 51 and a second cylindrical lens 52. In the vehicle lamp 100, a maximum length Wy of the first lens 5 in the vertical direction is smaller than a maximum length Wx of the first lens 5 in the left-right direction. The vehicle lamp 100 emits the light L including the light L4 and the light L5 forward through the exit surface 520.

For example, in a vehicle lamp, in order to improve the design of a vehicle when the vehicle lamp is disposed in the vehicle, it may be necessary to reduce the maximum length of the exit surface of the vehicle lamp in the vertical direction in some cases. However, if the maximum length of the exit surface of the vehicle lamp in the vertical direction is reduced, the amount of light exiting from a first projection lens would be reduced, and thus the light extraction efficiency of the vehicle lamp would be decreased.

In the vehicle lamp 100, the maximum length Wy of the first lens 5 in the vertical direction is smaller than the maximum length Wx of the first lens 5 in the left-right direction. Accordingly, in the vehicle lamp 100, a maximum length H of the exit surface 520 in the vertical direction can be reduced as compared to when the maximum length Wy of the first lens 5 in the vertical direction is greater than the maximum length Wx of the first lens 5 in the left-right direction.

Conversely, if the maximum width Wy of the first lens 5 in the vertical direction is smaller than the maximum width Wx of the first lens 5 in the left-right direction, there would be a possibility that the amount of light, of the light L1 emitted from the first light source 1, that is not incident on the first lens 5 in the vertical direction is increased and the light extraction efficiency of the vehicle lamp 100 is decreased. In view of the above, in the vehicle lamp 100, the pair of second reflective surfaces 30 of the second reflector 3 allow the light L2, of the light L1 emitted from the first light source 1, traveling without being reflected by the first reflective surface 20 to be reflected leftward and rightward. This light L2 would correspond to light, of the light L1 emitted from the first light source 1, that is not incident on the first lens 5 in the vertical direction because the maximum width Wy of the first lens 5 is smaller than the maximum width Wx. The vehicle lamp 100 allows the light L3, which is reflected light of the light L2 by the pair of second reflective surfaces 30, to be reflected forward by the pair of third reflective surfaces 40 of the third reflector 4, and the light L5, which is reflected light of the light L3, to be incident on the first lens 5. The first lens 5 receives the light L4 reflected by the first reflective surface 20 and the light L5 reflected by the pair of third reflective surfaces 40 and allows the light L4 and the light L5 to exit forward through the exit surface 520. The vehicle lamp 100 can emit, in addition to the light L4, the light L5 derived from the light L2 through the first lens 5. Accordingly, in the vehicle lamp 100, a decrease in light extraction efficiency because of the maximum length Wy of the first lens 5 being smaller than the maximum length Wx can be reduced. Further, in the vehicle lamp 100, the light L2 is reflected in the left-right direction by the pair of second reflective surfaces 30, and is then reflected forward by the pair of third reflective surfaces 40 so as to be incident on the first lens 5. Accordingly, in the vehicle lamp 100, the maximum length Wy of the first lens 5 in the vertical direction can be reduced.

As described above, in the present embodiment, the vehicle lamp 100 having high light extraction efficiency while reducing the maximum length H of the exit surface 520 in the vertical direction can be provided.

In the example illustrated in FIG. 1 to FIG. 8, the vehicle lamp 100 includes a light shielding member 6 disposed between the first reflective surface 20 and the first lens 5. The vehicle lamp 100 can emit light L having a low-beam light distribution by causing the light shielding member 6 to shield a portion of the light L4 traveling from the first reflective surface 20 toward the first lens 5. However, the vehicle lamp 100 may emit light L having a high-beam light distribution. If the vehicle lamp 100 emits light L having a high-beam light distribution, the vehicle lamp 100 does not necessarily include the light shielding member 6.

The configuration of the vehicle lamp 100 will be described in detail below.

(First Light Source 1)

The first light source 1 illustrated in FIG. 9 is, for example, an LED. The first light source 1 includes a package 11 and a light-emitting part 12.

In the example illustrated in FIG. 9, the package 11 is composed of a wiring board in which wiring connected to the light-emitting part 12 is provided in a base material made of a sintered body, and a resin member surrounding the light-emitting part. The wiring board is obtained by providing wiring in a sintered body of aluminum nitride or a sintered body of silicon carbide. The wiring board may be a wiring board in which an insulating layer is formed on the surface of a metal and a wiring pattern is further provided. The metal is copper, aluminum, or the like. The resin member is a resin member having a light shielding property, and preferably has light reflectivity. As the resin member, for example, a thermosetting resin, a thermoplastic resin, or the like can be used. Specifically, examples of the resin member include a resin containing particles of a light-reflective substance.

The light-emitting part 12 includes a light-emitting element, a wavelength conversion member, and the like, and emits light L1 of a desired color. The light-emitting element is, for example, a semiconductor light-emitting element. A semiconductor light-emitting element including a nitride semiconductor can be used as a light-emitting element that emits blue light, a light-emitting element that emits green light, or a light-emitting element that emits ultraviolet light. As the nitride semiconductor, for example, a GaN-based semiconductor such as GaN, InGaN, or AlGaN can be used. As a LED that emits red light, an InAlGaP-based semiconductor, a GaInP-based semiconductor, or a GaAs-based semiconductor such as GaAs or AlGaAs can be used. In a case where the vehicle lamp is used as a headlight, the light-emitting part 12 can emit white light by using a blue semiconductor light-emitting element and a yellow wavelength conversion member.

The first light source 1 illustrated in FIG. 9 has a light-emitting surface 120 facing upward. In the vehicle lamp 100, when dx represents a maximum length of the light-emitting surface 120 in the left-right direction and dz represents a maximum length of the light-emitting surface 120 in the front-rear direction, $1.0 \leq dx/dz \leq 3.0$ is preferably satisfied. By satisfying this condition, in the vehicle lamp 100, the light from the first light source 1 readily and efficiently enters the first lens 5 having the maximum length Wy in the vertical direction smaller than the maximum length Wx in the left-right direction. As a result, the vehicle lamp 100 can have high light extraction efficiency.

In the first light source 1, as an example, the maximum length dx can be 1.60 mm, and the maximum length dz can be 0.75 mm. Further, as an example, a maximum length d3 from the right end of the light-emitting surface 120 to the right end of the package 11 can be 0.50 mm, a maximum length d4 from the rear end of the light-emitting surface 120 to the rear end of the package 11 may be 0.35 mm, and a maximum length d5 from the front end of the light-emitting surface 120 to the front end of the package 11 can be 2.0 mm.

In the vehicle lamp 100, the maximum length H of the exit surface 520 in the vertical direction is preferably 20.0 mm or less, and the maximum length dz of the light-emitting surface 120 in the front-rear direction is preferably 1.2 mm or less. By satisfying this condition, in the vehicle lamp 100, the light from the first light source 1 tends to be efficiently incident on the first lens 5. As a result, the vehicle lamp 100 can have high light extraction efficiency.

The first light source 1 may have a plurality of light-emitting surfaces 120 and may include a plurality of light-emitting parts 12. If the first light source 1 includes a plurality of light-emitting parts 12, the maximum length dx corresponds to a maximum length from the left outer to the right outer edge of the entirety of the plurality of light-emitting parts 12. In addition, the maximum length dz corresponds to a maximum length from the front outer edge to the rear outer edge of the entirety of the plurality of light-emitting parts 12.

The first light source 1 does not necessarily have the light-emitting surface 120 facing upward, and may have a light-emitting surface 120 facing either upward or downward (the −Y side).

The first light source 1 illustrated in FIG. 1 to FIG. 8 can directly emit the light L1 upward. The term "directly" means that the light L1 is emitted upward from the light-emitting surface 120 in a state in which the light-emitting surface 120 of the first light source 1 faces upward. However, the first light source 1 can directly emit the light L1 either upward or downward. Further, the first light source 1 may indirectly emit the light L1 upward in the vertical direction. The term "indirectly" means that the light L1 is emitted upward by causing the light L1 emitted from the light-emitting surface 120 included in the first light source 1 to be reflected upward by an optical member in a state in which the light-emitting surface 120 faces a direction other than the upward direction. However, the first light source 1 can indirectly emit the light L1 either upward or downward in the vertical direction. The optical member can be composed of a mirror, a prism, a diffraction grating, a combination thereof, or the like.

(First Reflector 2, Second Reflector 3, and Third Reflector 4)

In the example illustrated in FIG. 1 to FIG. 8, each of the first reflector 2, the second reflector 3, and the third reflector 4 may be formed of a resin. At least the reflective surface(s) of each of the first reflector 2, the second reflector 3, and the third reflector 4 preferably include a metal material such as aluminum or silver. At least one of the first reflective surface 20 of the first reflector 2, the pair of second reflective surfaces 30 of the second reflector 3, or the pair of third reflective surfaces 40 of the third reflector 4 may be provided with a dielectric multilayer film.

In the vehicle lamp 100, either or both of the first reflective surface 20 and the second reflective surfaces 30 can include an elliptical surface. In the example illustrated in FIG. 1 to FIG. 8, each of the first reflective surface 20 and the second reflective surfaces 30 includes an elliptical surface. As used herein, the "elliptical surface" is a surface having two focal points and allowing light from one of the focal points to be reflected and focused on the other focal point.

Either or both of the first reflective surface 20 and the second reflective surfaces 30 include an elliptical surface, and thus the light L1 emitted from the first light source 1 can be reflected and converged by the elliptical surface. Accordingly, the spread of the light L1 emitted from the first light source 1 can be reduced, and the light L1 emitted from the first light source 1 can be efficiently incident on the first lens 5. In the example illustrated in FIG. 1 to FIG. 8, the vehicle lamp 100 allow the reflected and converged light by the first reflective surface 20 to be efficiently incident on the first lens 5. In addition, the vehicle lamp 100 reflects and converges the light L2, which travels without being reflected by the first reflective surface 20, leftward and rightward by the pair of second reflective surfaces 30. The vehicle lamp 100 causes the light L3 reflected and converged by the pair of second reflective surfaces 30 to be reflected by the pair of third reflective surfaces 40, thereby allowing the light L3 to be efficiently incident on the first lens 5. However, the vehicle lamp 100 does not necessarily have a configuration in which either or both of the first reflective surface 20 and the second reflective surfaces 30 include an elliptical surface. The first reflective surface 20, the second reflective surfaces 30, and the third reflective surfaces 40 may be surfaces having various shapes such as a flat surface, a concave surface, a convex surface, a spherical surface, an aspherical surface, and a diffractive surface.

In the example illustrated in FIG. 1 to FIG. 8, the first reflector 2 is a concave mirror having an elliptical first reflective surface 20. The first reflector 2, which is the concave mirror, is open upward, downward, and forward. As the pair of second reflective surfaces 30 located above the first reflective surface 20, the second reflector 3 has an elliptical second reflective surface 30 facing the lower left side and an elliptical second reflective surface 30 facing the lower right side. The pair of second reflective surfaces 30 reflect the light L2 leftward and rightward. The third reflector 4 has, as the pair of third reflective surfaces 40, an elliptical third reflective surface 40 located to the left of the second reflective surface 30 facing the lower left side and an ellipsoidal third reflective surface 40 located to the right of the second reflective surface 30 facing the lower right side. The pair of third reflective surfaces 40 reflect the light L3 from the pair of second reflective surfaces 30 forward.

In the example illustrated in FIG. 1 to FIG. 8, the second reflector 3 and the third reflector 4 are integrally formed as one member. By integrally forming the second reflector 3 and the third reflector 4, it is not necessary to adjust the relative position and the relative inclination of the pair of third reflective surfaces 40 with respect to the pair of second reflective surfaces 30, thereby making it possible to easily manufacture the vehicle lamp 100. However, the second reflector 3 and the third reflector 4 may be formed as separate members that are separated from each other. By forming the second reflector 3 and the third reflector 4 as separate members, the relative position and the relative inclination of the pair of third reflective surfaces 40 with respect to the pair of second reflective surfaces 30 can be adjusted, and thus the second reflector 3 and the third reflector 4 can be easily processed. The shapes of the second reflector 3 and the third reflector 4 can be changed as appropriate according to the specifications and the like of the vehicle lamp 100.

In the example illustrated in FIG. 10, each of the pair of third reflective surfaces 40 of the third reflector 4 has a flat shape. A spread angle θa in the left-right direction of the light L emitted through the exit surface 520 is determined by an angle θb formed by the pair of third reflective surfaces 40. In the vehicle lamp 100, by determining the angle θb formed by the pair of third reflective surfaces 40 in advance, the spread angle θa in the left-right direction of the light L emitted from the vehicle lamp 100 can be easily determined, and thus the irradiation range of the vehicle lamp 100 in the left-right direction can be easily determined.

(First Lens 5)

The first lens 5 illustrated in FIG. 1 to FIG. 8 includes the first cylindrical lens 51 having a curvature only in the left-right direction and the second cylindrical lens 52 having a curvature only in the vertical direction. The light L4 reflected by the first reflective surface 20 is transmitted through each of the first cylindrical lens 51 and the second cylindrical lens 52. The light L5 reflected by the third reflective surfaces 40 is transmitted through only the second cylindrical lens 52. With this configuration, as compared to when a lens that is rotationally symmetrical about the optical axis of the lens is used as the first lens 5, the maximum length of the first lens 5 in the vertical direction can be easily made smaller than the maximum length of the first lens 5 in the left-right direction. Further, the light L5 reflected by the third reflective surfaces 40 is not transmitted through the first cylindrical lens 51 and is transmitted through only the second cylindrical lens 52, and thus the number of lens interfaces on which the light L5 is incident can be reduced. Accordingly, the vehicle lamp 100 can reduce loss in the amount of light caused by interface reflection, and can have high light extraction efficiency.

In the example illustrated in FIG. 1 to FIG. 8, the second cylindrical lens 52 is located on the front side relative to the first cylindrical lens 51. With this configuration, for example, by decreasing the focal length of the first cylindrical lens 51, the light L emitted from the vehicle lamp 100 can be easily spread in the left-right direction. Further, for example, by increasing the focal length of the second cylindrical lens 52, the light L emitted from the vehicle lamp 100 can be narrowed in the vertical direction. Accordingly, a light distribution that is wide in the left-right direction and narrow in the vertical direction can be achieved while reducing loss in the amount of light.

The first lens 5 is not limited to a configuration in which the first cylindrical lens 51 and the second cylindrical lens 52 are included. The first lens 5 may be a lens having a large curvature in one direction, and may preferably be a cylindrical lens having a curvature only in one direction. The first lens 5 may be one lens, three or more lenses, or a lens that is rotationally symmetrical about the optical axis of the lens.

In the example illustrated in FIG. 1 to FIG. 8, each of the first cylindrical lens 51 and the second cylindrical lens 52 is a plano-convex lens having a convex surface on the front side and a flat surface on the rear side. However, the first lens 5 may include various types of lenses such as a biconvex lens, a plano-concave lens, a meniscus lens, a Fresnel lens, and a diffraction lens.

If the first lens 5 includes a plurality of lenses, the maximum length Wy of the first lens 5 in the vertical direction corresponds to the length from the uppermost outer edge to the lowermost outer edge of the entirety of the plurality of lenses when viewed from the front. The maximum length Wx of the first lens 5 in the left-right direction corresponds to the length from the leftmost outer edge to the rightmost outer edge of the entirety of the plurality of lenses when viewed from the front.

The first lens 5 illustrated in FIG. 1 to FIG. 8 includes the first cylindrical lens 51 and the second cylindrical lens 52. When viewed from the front, the uppermost outer edge of the first cylindrical lens 51 and the second cylindrical lens 52 is the upper outer edge of the first cylindrical lens 51. Further, when viewed from the front, the lowermost outer edge of the first cylindrical lens 51 and the second cylindrical lens 52 is the lower outer edge of each of the first cylindrical lens 51 and the second cylindrical lens 52. Therefore, the maximum length Wy of the first lens 5 in the vertical direction is the length from the upper outer edge of the first cylindrical lens 51 to the lower outer edge of each of the first cylindrical lens 51 and the second cylindrical lens 52. Further, when viewed from the front, the leftmost outer edge of the first cylindrical lens 51 and the second cylindrical lens 52 is the left outer edge of the second cylindrical lens 52. Further, when viewed from the front, the rightmost outer edge of the first cylindrical lens 51 and second cylindrical lens 52 is the right outer edge of the second cylindrical lens 52. Therefore, the maximum length Wx of the first lens 5 in the left-right direction is the length from the left outer edge of the second cylindrical lens 52 to the right outer edge of the second cylindrical lens 52.

In the example illustrated in FIG. 1 to FIG. 8, the shape of the outer edge of each of the first cylindrical lens 51 and the second cylindrical lens 52 when viewed from the front is a substantially rectangular shape. However, the shape of the outer edge of each of the lenses included in the first lens 5 when viewed from the front may be a substantially circular shape, a substantially elliptical shape, a substantially polygonal shape, or the like as long as the maximum length Wy of the first lens 5 is smaller than the maximum length Wx.

The first lens 5 includes a light-transmissive glass material or resin material. As the resin material, an acrylic resin, a polycarbonate resin, or the like can be used.

(Light Shielding Member 6)

The light shielding member 6 illustrated in FIG. 1 to FIG. 8 is a member that shields a portion of light reflected by the first reflective surface 20 of the first reflector 2. “Shielding light” by the light shielding member 6 means having a transmittance of less than 1% with respect to emitted light. The light shielding member 6 has light absorbency. “Light absorption” by the light shielding member 6 means having a reflectance of less than 1% with respect to emitted light. The color of the light shielding member 6 is preferably dark, and more preferably black. The light shielding member 6 is made of, for example, a metal material, and a black coating may be applied to the surface of the light shielding member 6.

Alternatively, the light shielding member 6 may be made of, for example, a resin material, and a black coating may be applied to the surface of the light shielding member 6. The light shielding member 6 may be made of a light absorbing material such as carbon black. However, the light shielding member 6 may have light reflectivity.

<Example of Low-Beam Light Distribution of Vehicle Lamp 100>

Figure 11:
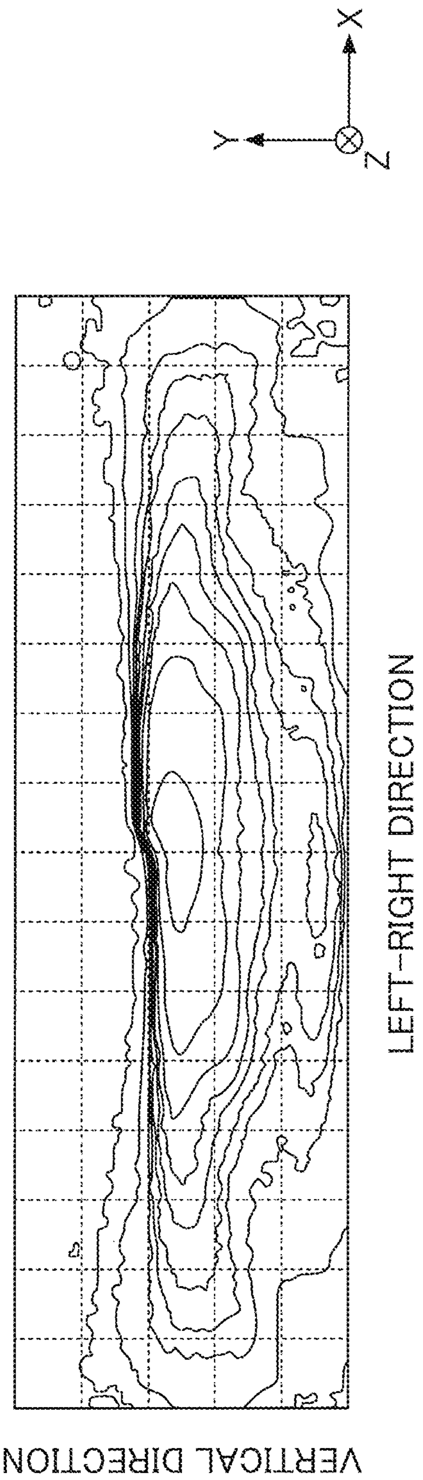
FIG. 11 is a drawing illustrating a low-beam light distribution of the vehicle lamp according to the first embodiment.

FIG. 11 is a drawing illustrating an example of a distribution of low-beam light emitted from the vehicle lamp 100. FIG. 11 illustrates simulation results of a distribution of low-beam light emitted from the vehicle lamp 100. Further, in FIG. 11, a luminous intensity distribution of light emitted from the vehicle lamp 100 onto an irradiation surface that is substantially orthogonal to the front-rear direction is depicted by contour lines. In order to prevent oncoming vehicles from being dazzled, a cutoff line is inclined upward to the right such that light emitted upward is cut.

Second Embodiment

Next, a vehicle lamp according to a second embodiment will be described. The same names and reference numerals as those in the above-described embodiment denote the same or similar members or configurations, and a detailed description thereof will be omitted as appropriate. The same applies to embodiments described later.

<Configuration of Vehicle Lamp According to Second Embodiment>

Figure 12:
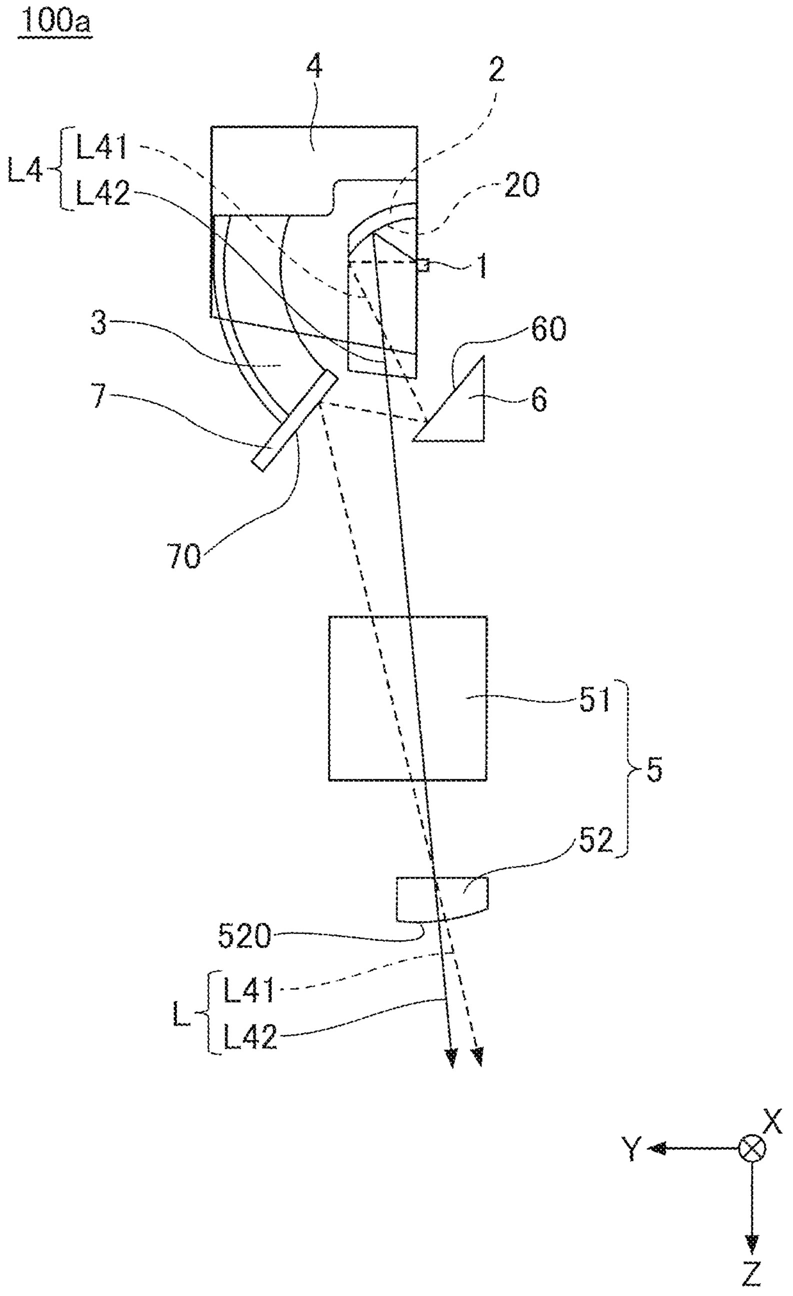
FIG. 12 is a schematic side view of a vehicle lamp according to a second embodiment.

FIG. 12 is a schematic side view illustrating an example of a vehicle lamp 100*a* according to the second embodiment. In FIG. 12, a portion of light L41 emitted through an exit surface 520 of the vehicle lamp 100*a* is indicated by a dashed arrow, and a portion of light L42 emitted through the exit surface 520 is indicated by a solid arrow.

As illustrated in FIG. 12, the vehicle lamp 100*a* includes a light shielding member 6 disposed between a first reflective surface 20 and a first lens 5, and a fourth reflector 7 having a fourth reflective surface 70. The light shielding member 6 shields light L41, which is a portion of light L4 from the first reflective surface 20, by reflecting the light L41 upward. The fourth reflective surface 70 is located above the light shielding member 6 so as to correspond to the light shielding member 6, and reflects the light L41 reflected by the light shielding member 6 forward. The first lens 5 receives the light L41 reflected by the fourth reflective surface 70 and allows the light L41 reflected by the fourth reflective surface 70 to exit forward through the exit surface 520. The vehicle lamp 100*a* mainly differs from the vehicle lamp according to the first embodiment in the above-described points.

In the example illustrated in FIG. 12, the light L4, which is a portion of the light L4 reflected by the first reflective surface 20 of the first reflector 2, is incident on a fifth reflective surface 60 of the light shielding member 6. The light shielding member 6 shields the light L41 by reflecting the light L41 upward by the fifth reflective surface 60. Further, light L42, which is almost entirely light other than the light L41 of the light L4, is incident on the first lens 5 without being reflected by the fifth reflective surface 60. The vehicle lamp 100*a* can emit light L, including the light L41 and the light L42 incident on the first lens 5, forward through the exit surface 520. The vehicle lamp 100*a* may emit light L, including the above-described light L5 in addition to the light L41 and the light L42, forward through the exit surface 520.

For example, a vehicle lamp generates a low beam by causing a light shielding member to shield a portion of light emitted from a light source. The light shielded by the light shielding member is not included in irradiation light from the vehicle lamp, and thus there would be a case where the light extraction efficiency of the vehicle lamp is decreased.

In the vehicle lamp 100*a* according to the present embodiment, the light shielding member 6 shields a portion of the light L4, which is emitted from the first light source 1 and then reflected by the first reflective surface 20, by reflecting the portion of the light L4 upward. Then, in the vehicle lamp 100*a*, the fourth reflective surface 70 reflects the light L41, reflected by the light shielding member 6, forward such that the light L41 is incident on the first lens 5. Accordingly, in the vehicle lamp 100*a*, the light L41 shielded by the light shielding member 6 can be included in irradiation light from the vehicle lamp 100*a*. As a result, in the present embodiment, the vehicle lamp 100*a* can have high light extraction efficiency.

The direction in which the light L41 is reflected by the light shielding member 6 is not limited to the upward direction, and may be at least one of the upward direction or the downward direction. The fourth reflective surface 70 may be located either above or below or both above and below the light shielding member 6 so as to correspond to the light shielding member 6. That is, in a case where the light shielding member 6 reflects the light L41 upward, the fourth reflective surface 70 may be located above the light shielding member 6. In a case where the light shielding member 6 reflects the light L41 downward, the fourth reflective surface 70 may be located below the light shielding member 6. Further, in a case where the light shielding member 6 reflects the light L41 upward and downward, the fourth reflective surface 70 may be located above and below the light shielding member 6.

A prism, a mirror, or the like having the fifth reflective surface 60 can be used as the light shielding member 6 of the vehicle lamp 100*a*. The fifth reflective surface 60 may be composed of a metal film such as aluminum or silver provided on a prism or a mirror.

The fourth reflector 7 can include a metal material such as aluminum or silver. In the example illustrated in FIG. 12, the fourth reflector 7 is a plate-shaped member provided at a front end portion of the second reflector 3. The fourth reflector 7 may be formed integrally with at least one of the second reflector 3 or the third reflector 4 as one member. Alternatively, the fourth reflector 7 may be formed as a member separate from each of the second reflector 3 and the third reflector 4.

Third Embodiment

Next, a vehicle lamp according to a third embodiment will be described.

<Configuration of Vehicle Lamp According to Third Embodiment>

Figure 13:
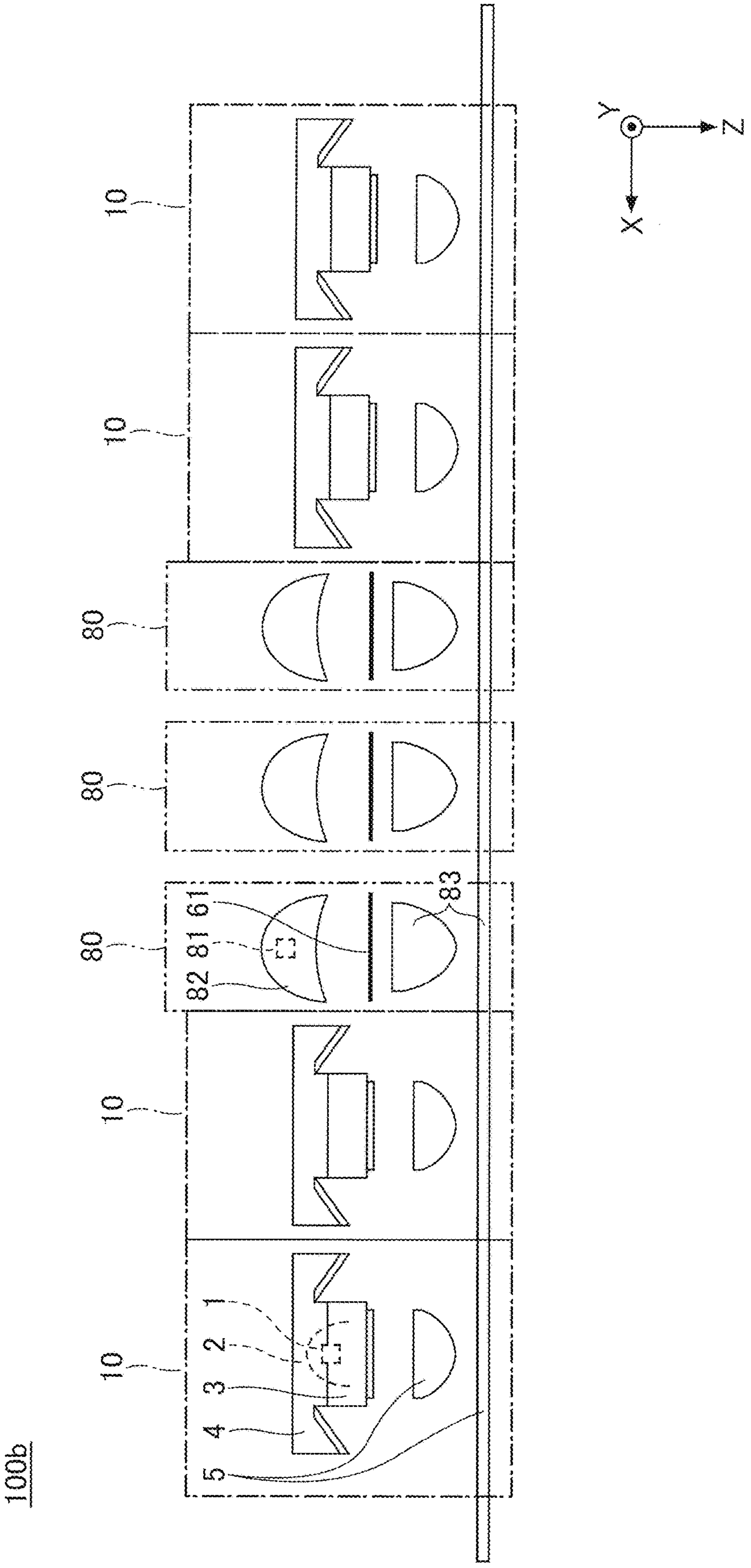
FIG. 13 is a schematic top view of a vehicle lamp according to a third embodiment.
Figure 14:
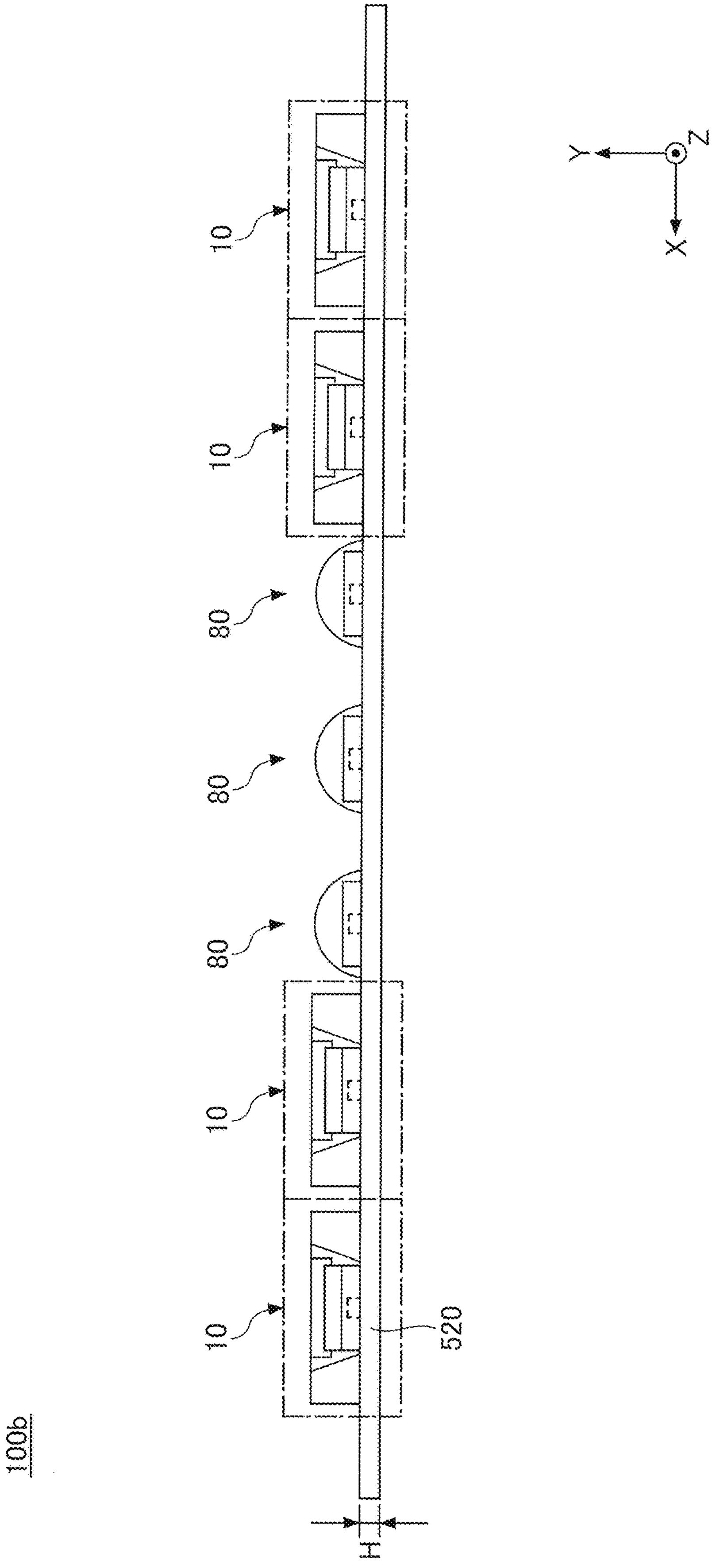
FIG. 14 is a schematic front view of the vehicle lamp according to the third embodiment.

The vehicle lamp according to the third embodiment will be described with reference to FIG. 13 and FIG. 14. FIG. 13 and FIG. 14 are drawings illustrating an example of a vehicle lamp 100*b* according to the third embodiment. FIG. 13 is a schematic top view of the vehicle lamp 100*b*. FIG. 14 is a schematic front view of the vehicle lamp 100*b*.

As illustrated in FIG. 13 and FIG. 14, the vehicle lamp 100*b* includes a plurality of first units 10 each including a first light source 1, a first reflector 2, a second reflector 3, a third reflector 4, and a first lens 5. The plurality of first units 10 are arranged in a row in the left-right direction. The vehicle lamp 100*b* mainly differs from the vehicle lamp according to the first embodiment in the above-described points.

The vehicle lamp 100*b* includes the plurality of first units 10. Thus, the amount of irradiation light extracted from the vehicle lamp 100*b* can be increased as compared to when the vehicle lamp 100*b* includes only one first unit 10. Further, in the vehicle lamp 100*b*, the plurality of first units 10 are arranged in a row in the left-right direction, and thus the maximum length H of an exit surface 520 of the vehicle lamp 100*b* in the vertical direction can be substantially equal to the maximum length of an exit surface of each of the plurality of first units 10 in the vertical direction. Accordingly, even when the vehicle lamp 100*b* includes the plurality of first units 10, the maximum length of the exit surface 520 in the vertical direction can be reduced.

Further, the vehicle lamp 100*b* can change a light distribution of light L emitted from the vehicle lamp 100*b* by individually changing the light emission state of the first light source 1 included in each of the plurality of first units 10. Accordingly, in the vehicle lamp 100*b*, the light distribution of the light L emitted from the vehicle lamp 100*b* can be varied.

In addition, the vehicle lamp 100*b* illustrated in FIG. 13 and FIG. 14 further includes at least one second unit 80 including a second light source 81 configured to directly or indirectly emit light in a direction along the vertical direction, a fifth reflector 82 configured to allow a portion of the light emitted from the second light source 81 to be reflected forward, and a second lens 83. The at least one second unit 80 can emit light having a light distribution different from a light distribution of light emitted from the plurality of first units 10. Further, the vehicle lamp 100*b* illustrated in FIG. 13 and FIG. 14 includes a light shielding member 61 disposed between the fifth reflector 82 and the second lens 83.

The vehicle lamp 100*b* can emit light having light distributions different from each other by using the at least one second unit 80 and the plurality of first units 10. Thus, a light distribution of light emitted from the vehicle lamp 100*b* can be efficiently set to a desired light distribution.

In the example illustrated in FIG. 13 and FIG. 14, three second units 80 are disposed between two first units 10 disposed on the left side and two first units 10 disposed on the right side. The three second units 80 irradiate a central region of an irradiation surface that is substantially orthogonal to the front-rear direction with light. The total of four first units 10 disposed on the left side and the right side irradiates a peripheral region around the central region, of the irradiation surface, irradiated with the light from the three second units 80. On the irradiation surface, light having a light distribution in which a light distribution of the three second units 80 and a light distribution of the four first units 10 are combined is obtained.

Figure 15:
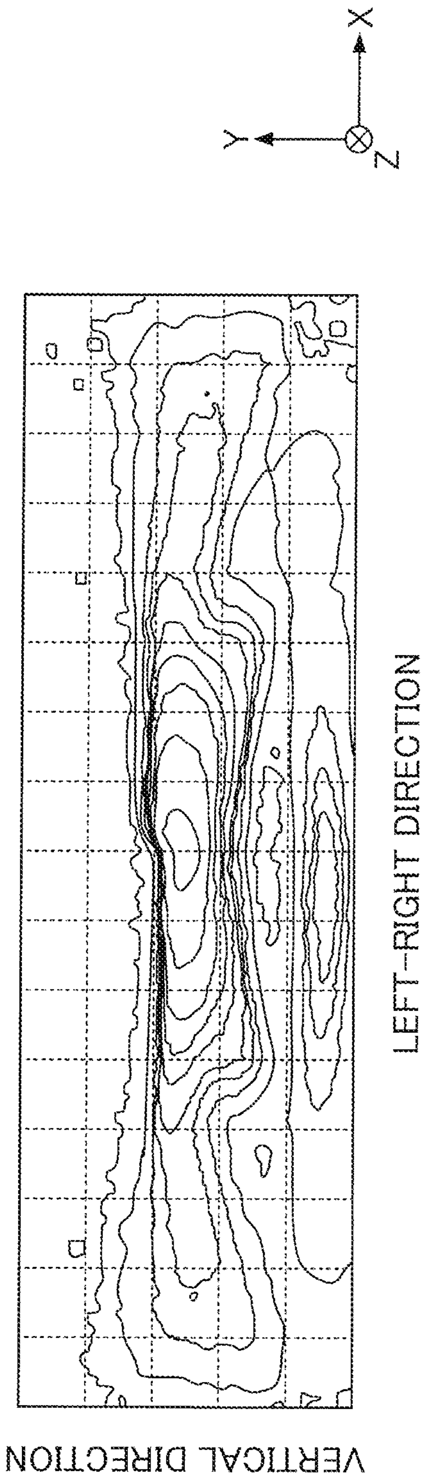
FIG. 15 is a drawing illustrating a light distribution of four first units included in the vehicle lamp according to the third embodiment.
Figure 16:
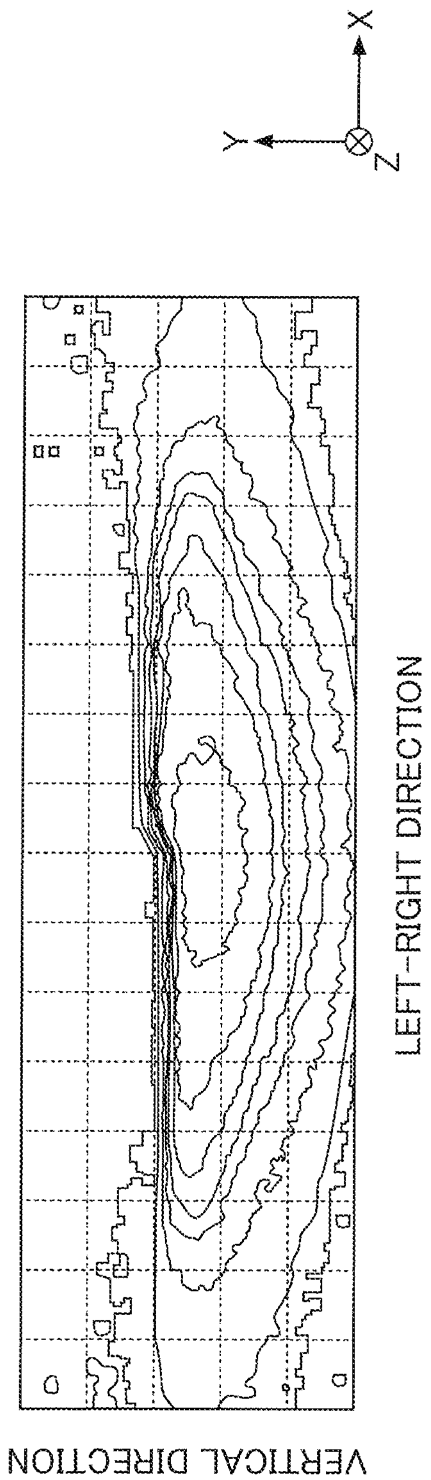
FIG. 16 is a drawing illustrating a light distribution of three second units included in the vehicle lamp according to the third embodiment.

FIG. 15 is a drawing illustrating an example of a light distribution of the four first units 10 included in the vehicle lamp 100*b*. FIG. 15 illustrates simulation results of a light distribution of light emitted from the four first units 10. FIG. 16 is a diagram illustrating an example of a light distribution of the three second units 80 included in the vehicle lamp 100*b*. FIG. 16 illustrates simulation results of a light distribution of light emitted from the three second units 80. In each of FIG. 15 and FIG. 16, a luminous intensity distribution of light emitted from the vehicle lamp 100 onto the irradiation surface that is substantially orthogonal to the front-rear direction is depicted by contour lines. As illustrated in FIG. 15 and FIG. 16, both the light distribution of the first units 10 and the light distribution of the second units 80 have cutoff lines. Thus, a light distribution suitable for a low beam is obtained.

As illustrated in FIG. 15 and FIG. 16, the light distribution of the light emitted from the three second units 80 is different from the light distribution of the light emitted from the four first units 10. In FIG. 15, the density of contour lines is high in the vicinity of the center. Therefore, it can be seen that the three second units 80 can emit light having a light distribution in which the luminous intensity is high in a central region of the irradiation surface. In FIG. 16, the density of contour lines is higher in a peripheral region around the vicinity of the center than in the vicinity of the center. Therefore, it can be seen that the four first units 10 can emit light having a light distribution in which the luminous intensity is high in the peripheral region of the irradiation surface. By combining the light distribution of the light emitted from the three second units 80 and the light distribution of the light emitted from the four first units 10, the vehicle lamp 100*b* can efficiently obtain, for example, light having a light distribution similar to the low-beam light distribution illustrated in FIG. 11. The number of the first units 10 and the number of the second units 80 are not limited to those illustrated in the example of FIG. 15 and FIG. 16, and can be adjusted as appropriate. Further, the arrangement of the first units 10 and the second units 80 is not limited to that illustrated in the example of FIG. 15 and FIG. 16, and the first units 10 and the second units 80 can be arranged as appropriate. For example, the second units 80 may be arranged at the left end and the right end.

The vehicle lamp 100*a* according to the second embodiment and the vehicle lamp 100*b* according to the third embodiment can be combined. Specifically, each of the plurality of first units 10 of the vehicle lamp 100*b* can further include a light shielding member 6 disposed between the first reflective surface 20 and the first lens 5, and a fourth reflector 7 having a fourth reflective surface 70. With this configuration, effects of the second embodiment and effects of the third embodiment can be obtained together.

Although embodiments have been described in detail above, the above-described embodiments are non-limiting examples, and various modifications and substitutions can be made to the above-described embodiments without departing from the scope described in the claims.

The numbers such as ordinal numbers and quantities used in the description of the embodiments are all exemplified to specifically describe the technique of the present disclosure, and the present disclosure is not limited to the exemplified numbers. In addition, the connection relationship between the components is illustrated for specifically describing the technique of the present disclosure, and the connection relationship for implementing the functions of the present disclosure is not limited thereto.

Each of the vehicle lamps according to the present disclosure has a short maximum length of the exit surface in the vertical direction and has high light extraction efficiency. Thus, in particular, the vehicle lamps according to the present disclosure can be suitably used as lamps for automobiles. In the embodiments according to the present disclosure, the vehicle lamps used as headlights are exemplified; however, the present disclosure is not limited thereto. For example, the vehicle lamps can be used for various applications such as communication lamps and daytime running lamps. Further, the application of the vehicle lamps according to the present disclosure is not limited to applications in which the vehicle lamps are mounted on automobiles. The vehicle lamps according to the present disclosure can be used as lamps for aerial vehicles such as helicopters and drones.

According to one embodiment of the present disclosure, a vehicle lamp having high light extraction efficiency while reducing the maximum length of an exit surface in the vertical direction can be provided.

What is claimed is:

1. A vehicle lamp for emitting light through an exit surface forward in a front-rear direction intersecting a vertical direction, the vehicle lamp comprising:

- a first light source configured to directly or indirectly emit light in a direction along the vertical direction;
- a first reflector having a first reflective surface that allows a portion of the light emitted from the first light source to be reflected forward;
- a second reflector having a pair of second reflective surfaces, the pair of second reflective surfaces being located above the first reflective surface in the vertical direction, and allowing light, of the light emitted from the first light source, traveling without being reflected by the first reflective surface to be reflected leftward and rightward in a left-right direction intersecting each of the front-rear direction and the vertical direction;
- a third reflector having a pair of third reflective surfaces, the pair of third reflective surfaces being located at a left side and a right side of the first reflective surface in the left-right direction so as to correspond to the pair of second reflective surfaces, and allowing light reflected by the pair of second reflective surfaces to be reflected forward; and
- a first lens having the exit surface, and configured to receive light reflected by the first reflective surface and light reflected by the pair of third reflective surfaces and allow the light reflected by the first reflective surface and the light reflected by the pair of third reflective surfaces to exit forward through the exit surface, wherein
- a maximum length of the first lens in the vertical direction is smaller than a maximum length of the first lens in the left-right direction.

2. The vehicle lamp according to claim 1, wherein either or both of the first reflective surface and the pair of the second reflective surfaces include an elliptical surface.

3. The vehicle lamp according to claim 1, wherein
the first lens includes
a first cylindrical lens having a curvature in only the left-right direction, and
a second cylindrical lens having a curvature in only the vertical direction,
the light reflected by the first reflective surface is transmitted through each of the first cylindrical lens and the second cylindrical lens, and
the light reflected by the pair of third reflective surfaces is transmitted through only the second cylindrical lens.

4. The vehicle lamp according to claim 3, wherein the second cylindrical lens is located on a front side relative to the first cylindrical lens.

5. The vehicle lamp according to claim 1, wherein
the first light source has a light-emitting surface facing upward or downward in the vertical direction, and
when dx represents a maximum length of the light-emitting surface in the left-right direction and dz represents a maximum length of the light-emitting surface in the front-rear direction, $1.0 \leq dx/dz \leq 3.0$ is satisfied.

6. The vehicle lamp according to claim 5, wherein
a maximum length of the exit surface in the vertical direction is 20.0 mm or less, and
the maximum length of the light-emitting surface in the front-rear direction is 1.2 mm or less.

7. The vehicle lamp according to claim 1, further comprising:
a plurality of first units each including the first light source, the first reflector, the second reflector, the third reflector, and the first lens, wherein
the plurality of first units are arranged in a row in the left-right direction.

8. The vehicle lamp according to claim 7, wherein a light distribution of the light emitted from the vehicle lamp is changeable by individually changing a light emission state of the first light source included in each of the plurality of first units.

9. The vehicle lamp according to claim 1, wherein
each of the pair of third reflective surfaces has a flat shape, and
a spread angle in the left-right direction of the light emitted through the exit surface is determined by an angle formed by the pair of third reflective surfaces.

10. The vehicle lamp according to claim 1, further comprising:
a light shielding member disposed between the first reflective surface and the first lens; and
a fourth reflector having a fourth reflective surface, wherein
the light shielding member is configured to shield a portion of light from the first reflective surface by reflecting the portion of the light either upward, downward, or both in the vertical direction,
the fourth reflective surface is located either above or below or both above and below the light shielding member so as to correspond to the light shielding member, and reflects light reflected by the light shielding member, and
the first lens is configured to receive light reflected by the fourth reflective surface and allow the light reflected by the fourth reflective surface to exit forward through the exit surface.

11. The vehicle lamp according to claim 7, further comprising:
at least one second unit including
a second light source configured to directly or indirectly emit light in a direction along the vertical direction,
a fifth reflector configured to reflect a portion of the light, emitted from the second light source, forward, and
a second lens, wherein
the at least one second unit is configured to emit light having a light distribution different from a light distribution of light emitted from the plurality of first units.

* * * * *